Figure 1:
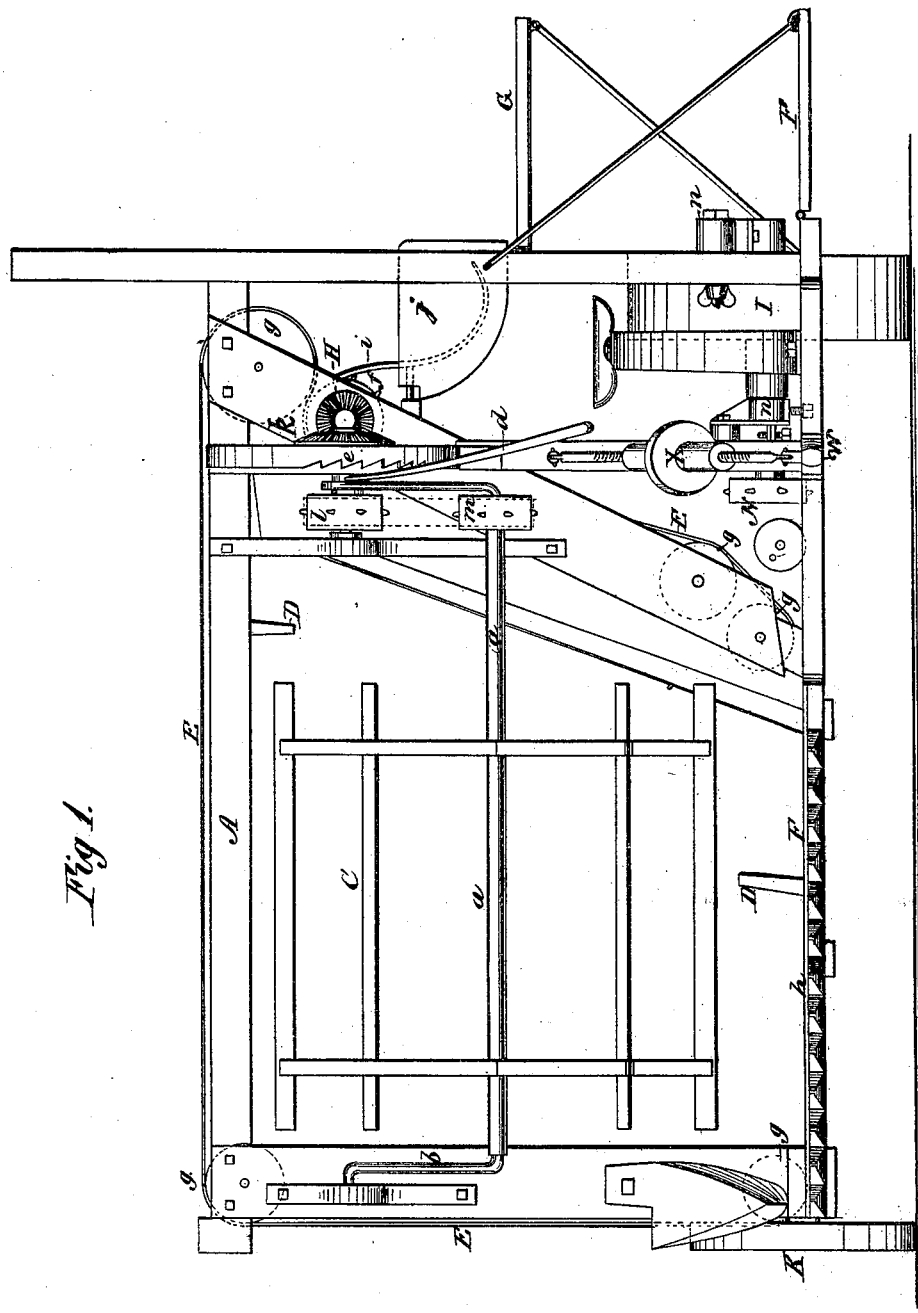

J. MILLER.
HARVESTERS.

No. 179,591. Patented July 4, 1876.

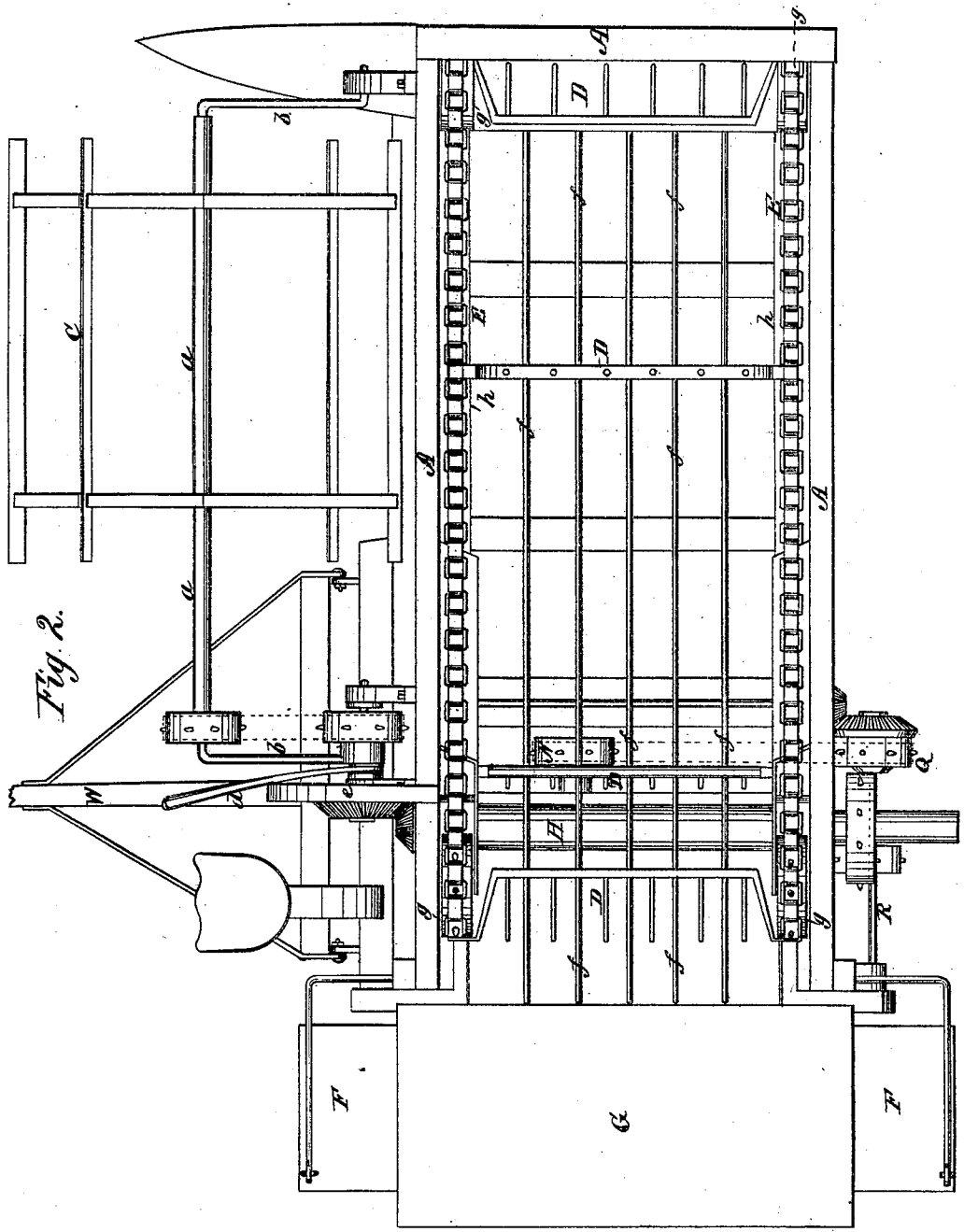

J. MILLER.
HARVESTERS.
No. 179,591. Patented July 4, 1876.
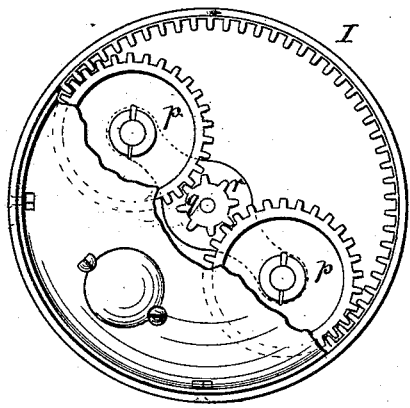
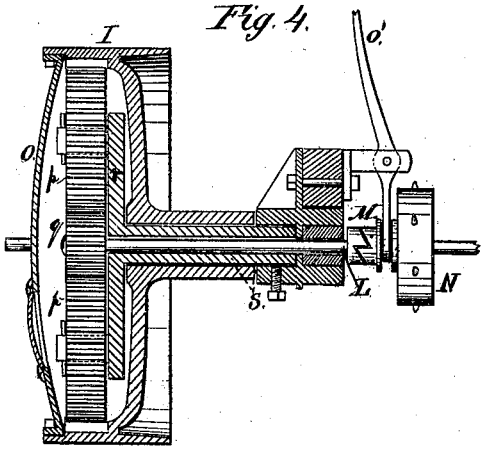
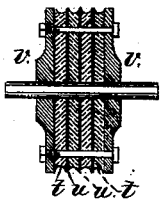
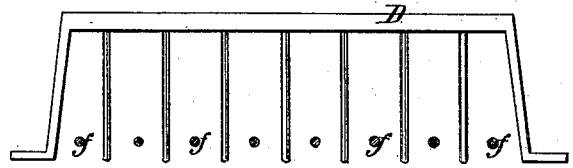
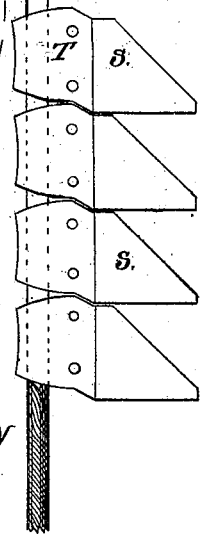
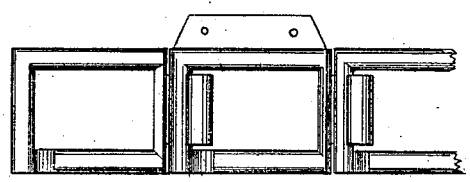
WITNESSES:
W. W. Hollingsworth
John C. Kenon
INVENTOR:
Jos. Miller
BY
ATTORNEYS.
N. PETERS, PHOTO-LITHOGRAPHER, WASHINGTON, D. C.

UNITED STATES PATENT OFFICE.

JOSEPH MILLER, OF SOUTH BEND, INDIANA.

IMPROVEMENT IN HARVESTERS.

Specification forming part of Letters Patent No. 179,591, dated July 4, 1876; application filed March 27, 1876.

*To all whom it may concern:*

Be it known that I, JOSEPH MILLER, of South Bend, in the county of St. Joseph and State of Indiana, have invented a new and useful Improvement in Harvesters; and I do hereby declare that the following is a full, clear, and exact description of the same.

My invention is an improvement in the class of reapers which are provided with a traveling rake for conveying the cut grain up an elevator and delivering it upon a binders' table, or into a receptacle, from which it may be removed by hand, or discharged by any suitable mechanical means.

The improvement relates to the arrangement of endless traveling rake-carrying chains, the pulleys on which the same are mounted, and the supplementary driving-shaft; to the arrangement of the driving-wheel shaft, and the tubular shaft of cross-head carrying the gears, which mesh with and thus communicate motion from driving-wheel to the pinion of the driving-shaft; and to providing the cutter-plates with a shoulder, and beveling the same on the rear side or edge, as hereinafter described.

In the accompanying drawing, forming part of this specification, Figure 1 is a front elevation of my improved machine; Fig. 2, a plan view of the same. Figs. 3, 4, 5, 6, 7, and 8 are detail views, to be hereinafter described.

I will first describe the reel and rake mechanism.

The frame A of the machine is, essentially, rectangular in form. The reel C is secured to a sleeve or tubular shaft, *a*, which is mounted upon a cranked rod, *b*, pivoted to the front of the frame A. The reel-arms may be tightly clamped upon this sleeve; but the latter fits loosely upon the rod *b*, and, hence, the reel revolves freely thereon, with but little friction.

The reel is adjusted at various heights from the cutter-bar, to regulate its action upon the standing grain, by means of a spring-lever, *d*, and curved rack-bar *e*, the lever being attached to the side of the cranked rod *b*, and engaging with the teeth of the rack-bar, Figs. 1 and 2.

The grain-platform, elevator, and incline, or delivery, are composed of parallel rods *f*. The grain is swept along the platform, and up the elevator at the end thereof, by means of a traveling rake—that is to say, a rake composed of a series of toothed bars, D, and endless chains E. The latter are arranged to pass around idle-pulleys or chain-wheels *g*, located at or near the corners of the frame, and caused to travel from right to left—*i. e.*, toward the left at the top of the frame over the platform, and to the right when moving the grain across the platform. Two pulleys, *g g*, are placed at the junction of the platform and elevator, in order that the curve or angle described by it may correspond to that of the platform and elevator. Each of the toothed bars D has the form of a double crank, its ends being secured to opposite chains E, and its teeth projecting up or down, according as it is making its return movement, or operating to sweep across it. The chain-links, to which the bars are attached, are, preferably, provided with flanges for that purpose, as shown in Fig. 7. Metal plates *h* are placed at the front and rear sides of the platform, to prevent the cut grain becoming entangled with the chains and impeding their movement.

The arrangement of the rake to pass around pulleys at the upper left-hand corners of the frame leaves an open space above the cutter-bar and platform for the reel to revolve in and act upon the grain whatever be its adjustment.

The operation of the rake is apparent, and the grain is delivered by the rake at the top of the elevator, and falls by its own gravity down the incline *i* into the receiver *j*, when the gavels are taken by two men alternately, who stand at the respective ends of the platform F, each binding his gavel at his end of the table G, and removing it thence as soon as bound and depositing it in the stubble. The traveling rake receives motion immediately from the shaft H, Fig. 2, which is arranged near the top of the frame A, transversely thereof, and parallel to the direction of motion of the machine. The chains E engage toothed wheels or hubs of said shaft, over which they pass from the idle-pulleys located immediately above them. The same shaft H communicates motion to the reel-sleeve by means of bevel-gears $k$, pulleys $l\ m$, and chain or belt passing around them, Figs. 1, 2.

The rotation of the reel is not affected by the adjustment above described, since the cranked rod, upon which it is mounted, rotates around the axis of pulley $l$ as a center. It may, hence, be quickly and easily adjusted at any time while the machine is in operation.

I will next describe the driving and transporting mechanism.

The machine is supported upon driving-wheel I and the wheel K, Fig. 1. The former has its bearings in boxes attached to two parallel bars, $n\ n$, Fig. 1, pivoted at one end, and made adjustable at the other by means of clamp-screws working in slots in the vertical parts of the frame A. The wheel K is also made vertically adjustable. By these means the body of the machine may be adjusted higher or lower, as required by the nature of the ground upon which it is being used, and the height or other condition of the grain being cut. The driving-wheel I is internally toothed, and has a removable side, $o$, Figs. 3, 4. It is mounted loosely on the driving-shaft L, and motion is communicated from the wheel to the shaft, as the machine is drawn forward, by means of gears $p\ p$ and pinion $q$. Said gears $p$ are about twice the diameter of the pinion, and are mounted loosely upon wrist-pins fixed in a cross-head, $r$, formed on the end of a tubular shaft, $s$, which fits in the elongated hub of the driving-wheel, Fig. 4. The shaft $s$ is clamped by a screw, Fig. 4, and hence the cross-head and gears cannot revolve around the pinion.

The result of this construction and arrangement is, that the rotation of the driving-wheel causes the rotation of the gears $p\ p$, and thereby also of the driving-shaft L.

The manner of securing the tubular shaft $s$ enables it to be readily detached from the driving-shaft when required, for repair or other purpose.

The shifting clutch-pulley N on said shaft is thrown into gear with the shaft by the lever O', so that the reel, rake, and cutting mechanism may be thrown into or out of operation at will.

I show in Fig. 5 a pulley having a series of grooves, to receive a corresponding number of small wire cables, which I design to form the connection between the pulley N and pulley Q, keyed on a shaft, R, at the rear of the machine, Figs. 1, 2. The pulley is formed of rubber and metal disks $t\ u$, alternately arranged, and clamped between plates $v$. The edge of each rubber disk constitutes the bottom of a groove, so that the requisite degree of friction is obtained to prevent the cables slipping around the pulley. (I reserve the right to make a separate application for Letters Patent for said pulley.)

I have shown in Fig. 6 a series of cutters, S, secured to plates T by means of clamp-bolts. Said plates are provided with an eye, to adapt them to be strung on the wire cable V, and are beveled at their rear corners, also curved on the rear edge, to adapt them to work together with little friction as possible, and to conform to the periphery of the pulley V' when passing around it. The plates are provided with shoulders, so that each supports the cutter on the left, when the cutters are in a straight line, and also prevents kinking the cable. The pulley V' will have its groove filled with rubber, to impart the requisite degree of friction to the endless cutter. The pulley will be keyed on a shaft placed vertically in suitable proximity to the driving-shaft, and deriving motion from it by means of a chain or wire cable, as will be readily understood without specific description and illustration.

The machine is nearly poised or balanced upon the transporting-wheels I K, and the inclination of the pivoted tongue W, Fig. 1, may be changed at will, to vary the angle of the cutter-bar and grain-platform to the surface of the field. This is effected by means of a tube, X, having a right and left screw-thread at its respective ends, to adapt it to receive correspondingly-threaded rods $w$, which are pivoted to the frame and tongue. The tube is provided with a central boss, in the nature of a hand-wheel, by which it may be turned to effect the desired adjustment of the tongue.

Having thus described my invention, what I claim as new is—

1. The combination of the parallel chains and cranked rake-bars, the idle-pulleys, located at the corners of the grain-platform and upper angles of the frame A, the supplementary driving-shaft, provided with toothed hubs, and the parallel rods $f$, forming the bottom of the platform and the elevator, all arranged in the manner shown and described, to operate as specified.

2. The combination of the cross-head, carrying the gears $p\ p$ and the tubular shaft, the driving-wheel, having the extended hollow hub, the clamp-screw, and driving-shaft, as shown and described.

3. The cutter-plates having their rear corners beveled, and provided with engaging-shoulders, as shown, in combination with the cable and pulley, as described.

JOSEPH MILLER.

Witnesses:
 AMOS W. HART,
 SOLON C. KEMON.